Nov. 21, 1933.  A. E. PEW, JR., ET AL  1,935,953
PROCESS OF MINERAL OIL DISTILLATION
Filed March 5, 1925  5 Sheets-Sheet 1

Nov. 21, 1933.  A. E. PEW, JR., ET AL  1,935,953
PROCESS OF MINERAL OIL DISTILLATION
Filed March 5, 1925   5 Sheets-Sheet 5

WITNESS:
Rob't R. Kitchel.

INVENTORS
Arthur E. Pew, Jr.
Henry Thomas
BY Busser and Harding
ATTORNEYS.

Patented Nov. 21, 1933

1,935,953

UNITED STATES PATENT OFFICE 1,935,953

PROCESS OF MINERAL OIL DISTILLATION

Arthur E. Pew, Jr., Bryn Mawr, and Henry Thomas, Ridley Park, Pa., assignors to Sun Oil Company, Philadelphia, Pa., a corporation of New Jersey Application March 5, 1925. Serial No. 13,040

10 Claims. (Cl. 196—119)

In the distillation of mineral oils by the most commonly used processes, as, for example, where the oil is first "topped" to evaporate off the lighter fractions, such as gasoline and fuel oil, and then fractionally distilled for the purpose of producing various grades of lubricating oil, it is difficult to produce the highest grades of refined products; and, even to produce the ordinary grades of lubricating oils that are acceptable as commercial products for most purposes, it is necessary to subject the distillates either to treatment with sulphuric acid and caustic soda and washing with water, or filtration through fuller's earth or some other clarifying and decolorizing agent, or both in order to remove from the oil contaminating materials that have been produced in the distillation process.

These contaminating materials are the products of decomposition and cracking which occur during distillation by reason of the high heat to which the oil is subjected to effect its evaporation, the considerable time to which any given quantity of oil is exposed to such heat, and the pressure (usually atmospheric) to which it is subjected during evaporation, as hereinafter more fully explained. If the heating agent could be maintained at such a temperature and applied in such a way and under such conditions as to avoid this objectionable decomposition and cracking, there could be no occasion to subject the distillates to the expensive, cumbersome, wasteful and time-consuming chemical and physical purification processes which are now customarily employed.

The object of the present invention is to provide a distillation process wherein decomposition and cracking will be entirely avoided, or so very greatly minimized, that the products of distillation will, without further treatment, meet all the requirements of commerical lubricating oil and even produce, by careful fractionation, the highest grade products. A further object of the invention is to produce such lubricating oils by the use of plant units of reasonable size, in such large volumes as to make the process much more expeditious than the customary processes, and much more economical with respect to capital charge of plant and cost of operation.

After prolonged experiment followed by the practice of the process in a relatively small plant, but on a commercial scale, we have succeeded in producing refined lubricating oils meeting all commercial requirements. Our experiments and the practical use of the process have convinced us that the success of the process is dependent on the establishment and maintenance of certain conditions, without all of which the results sought are unobtainable. Some of the factors promotive of success are (broadly speaking) separately old in the art of distilling mineral oil, but some are new in the art of mineral oil distillation, but it should be understood that the primary invention does not depend, for its novelty, on the novelty of the individual features, but on the unitary combination of features hereinafter described and particularly claimed. The principal features of the process are:

(1) The distribution of the oil in a thin layer, envelope or film over an extended surface in heat-exchange relation, but out of contact, with the heating agent, thereby greatly expediting the rate of evaporation.

(2) The continuous inflow and outflow of oil to and from the locus of application of heat and the subjection of the oil to the action of heat for a restricted time.

(3) The maintenance of a high, but not necessarily, and indeed not preferably, an extremely high, vacuum in the oil vaporizing elements of the distilling plant. The vacuum may, however, be comparatively low where the character of the crude oil is such that it is not readily decomposable. In the case of certain high grade crude oils which do not readily decompose except under high heat conditions or under exposure to heat for a prolonged time, it may be possible to vaporize at atmospheric pressure; and the invention, in its broader aspect, is not limited to vaporization under vacuum. Aside, however, from the character of the oil, the nature of the heating agent below specified is such as to make it highly desirable to avoid unnecessarily high temperatures; and for this reason, also, the vaporization of the oil under vacuum is an important preferential feature. It will be understood, however, that vaporization under vacuum is not indispensable to the distillation of those fractions that are vaporizable under atmospheric pressure at a temperature approximating, or lower than, a cracking temperature. When the process is applied, as it can be, to the distillation of fractions as light as gasoline, vaporization under vacuum may not even be desirable. Throughout the present specification, however, detailed comments and descriptions are more particularly applicable to the process when applied to the distillation of the heavier fractions of mineral oil, in which field we have made our successful practical and commercial use.

(4) Provision for free escape of the oil vapors immediately after vaporization with avoidance of substantial contact of the vapors with incoming oil so as to avoid substantial refluxing, with resultant decomposition and cracking and entrainment of particles of incoming oil with escaping vapors.

(5) Avoidance of the presence or leakage of air into the oil vaporizing chambers and the oil vapor lines, regardless of the absolute pressure that is maintained in the oil system. Air in small quantity in the oil system has an oxidizing effect which seriously contaminates the product.

(6) The avoidance of direct heat exchange between the oil vapors and the heating medium.

(7) The indirect application of the primary heating agent, and the direct transmission of heat to the oil by means of a secondary heating agent which boils, under practicable absolute pressures, at temperatures desirable in oil distillation, and which, in its vapor phase, flows into heat exchange relation with the oil and is condensed thereby and gives up its latent heat to the oil, the condensate returning to a liquid body of the substance, which is continually being heated by the primary heating agent and continually generating vapor. The direct heating agent must be one which is not merely theoretically, or even practically, operative, but which, under the conditions above enumerated, is also commercially practicable, and adaptable to a plant that is not of impracticably large size.

Old prior patents disclose the conception of flowing oil in fine streams over pipes through which superheated steam circulates, the still being under a partial vacuum; also the flowing of oil through vapor boxes each comprising a succession of inclined plates arranged in zigzag relationship in heat exchange relationship with channels for superheated steam. Such processes, however, have not been commercialized, and are not commercially practicable, because (if for no other reason), in generating sufficient steam at a sufficiently high temperature to vaporize the lubricating fractions of mineral oil, only a very small proportion of the heat required to generate the steam is effective to vaporize the oil, and because the volume of steam required is so enormous as to involve the use of a plant of impracticably large size. Moreover, in these old processes, there is considerable refluxing, due to the rising vapors contacting with downflowing oil, causing partial condensation, with decomposition and cracking.

We have discovered that a vaporized metallic liquid, and particularly mercury vapor, is of extraordinary efficiency as a direct heating agent in a process for distilling mineral oil that is characterized also by the other features above enumerated. It has a high boiling point and high heat conductivity; it will not oxidize or disintegrate when heated or brought into contact with iron; and it may be condensed and its latent heat transferred to the oil by heat exchange at the temperatures desirable in the distillation of lubricating oil fractions. As compared with superheated steam, its efficiency is many times greater. With such a vaporized metallic liquid, nearly all its heat units are usefully utilized, whereas with superheated steam only a very small fraction can be usefully expended in heating oil. With such a vaporized metallic liquid, the latent heat of condensation is the main source of heat, whereas in superheated steam only a fraction of the heat added by the superheater (which added heat represents but a small fraction of its total heat units) can be transferred to the oil, and there is no transfer of latent heat of condensation. With such a vaporized metallic liquid, the volume of vapor required is but a very small fraction of the volume of superheated steam that would be necessary to do the same work. The same serious defects attach to the use of hot gases. The use of a vaporized metallic liquid, preferably mercury vapor, for the purpose of carrying out technical processes involving high temperature operations or pyro-chemical reactions, by flowing a current of the same along the wall of a chamber containing a batch of material, has been patented; but its use as a heating agent for the vaporization of lubricating or other mineral oil with avoidance or minimization of decomposition has not been, it is believed, heretofore suggested; and indeed its employment as such a heating agent is believed not to be efficient, or even practicable, except when utilized in the way which we have developed in the reduction to practice of our invention. In short, our process involves the use of a heating agent not heretofore known in the art of mineral oil distillation, its application in a way in which it has not heretofore been applied in any other art, the selection of certain features of known mineral oil distillation processes and their substantial modification to adapt them to the use of mercury vapor as a heating agent, and the provision of other features altogether new in the art of oil distillation.

Another important advantage of the use of mercury vapor as a heating agent is that it renders practicable the use of the well known distillation of mineral oil under a vacuum. The principal advantage of vacuum distillation is that it reduces decomposition and cracking and with a sufficiently high vacuum practically avoids such decomposition and cracking. Vacuum distillation processes have not, however, gone into extensive commercial use. The use of a vacuum which would ordinarily be considered high, but which does not approximate a perfect vacuum, has not so far reduced decomposition and cracking as to eliminate the necessity for subjecting the distillates to purification treatment; and such processes exhibit only the advantage over distillation under atmospheric pressure of a reduced temperature of vaporization, which advantage does not counterbalance the difficulties and expense of maintaining the vacuum. It is true that by the use of an apparatus supposed to provide a very high vacuum, say well over twenty-nine inches, high grade products, although not the highest grade products requiring no subsequent purification treatments, have been produced; but the output of such processes—that is, yield relative to size and cost of plant—has been so restricted that it is not commercially economical to produce thereby ordinary commercial lubricating oils satisfactory for general use. Where, however, mercury vapor as a heating agent is used under the conditions characterizing our process, it is quite possible to manufacture, from topped crude oil having readily decomposable constituents, high grade lubricating distillates with the oil system under a degree of vacuum which, while desirably high, may be low relatively to that heretofore deemed necessary. In other words, we can secure as good a product with a vacuum much under twenty-nine inches (say twenty-five inches) as with a vacuum that, in batch stills, is nearly perfect (say a few mm. mercury absolute pressure)—a result that had heretofore been deemed impossible. Indeed, we prefer a vacuum of (say)

30–50 mm. absolute pressure of mercury to a vacuum of say 5–10 mm. absolute pressure of mercury. The higher vacuum has the advantage, of course, of requiring, with a given time allowed for evaporation, slightly less heat; but bearing in mind that the size of equipment required to maintain a partial vacuum increases at a high geometrical rate and that to maintain a vacuum of 5 mm. mercury absolute pressure requires eight times the size of equipment required to maintain a vacuum of 40 mm. mercury absolute pressure, and that the lower the vacuum, the smaller the equipment required to maintain it, the advantage of a process that does not require an abnormally high vacuum is obvious.

The explanation for our success in avoiding the decomposition that characterizes ordinary oil distillation processes and in thereby securing, from crude oil having readily decomposable constituents, a merchantable oil without any treatment subsequent to the condensation of the oil vapors is, we think, as follows: Cracking, or decomposition, is the result of three factors: temperature, pressure and time. This is illustrated by the fact that heat and superatmospheric pressure applied for a considerable time are the principal factors in most processes for the manufacture of gasoline, in which maximum cracking, instead of being an evil to be avoided, is a desideratum. If evaporation be slow, as where a large batch of oil is subjected to distillation, decomposition cannot be avoided except by a maximum reduction of temperature and a degree of vacuum that approaches close to an absolute vacuum. In our process, by greatly reducing the time element and greatly expediting the evaporation, the same result can be accomplished by means of a higher temperature and a lower vacuum. That is, a reduction in the time factor permits of increases in temperature and absolute pressure without producing a substantial amount of cracking. With a vacuum maintained, for example, at 28½ inches (although a much lower vacuum is permissible, in our process, except when distilling the highest boiling fractions) mercury vapor can be generated close to atmospheric pressure, and will, at that pressure, condense at a temperature corresponding to that desired for evaporating all the lower boiling point lubricating fractions. By maintaining on the oil a vacuum of between twenty-eight and twenty-nine inches, the mercury may be condensed and its latent heat transferred to the oil by heat exchange at temperatures which are at the same time the most desirable for distillation of all except the highest boiling point fractions and the most desirable for the generation of mercury vapor.

Another explanation for our success in minimizing or avoiding the decomposition that occurs even in processes supposed to provide an extremely high vacuum (one to 25 millimeters mercury absolute pressure) is that, when such processes are conducted in batch stills, owing to the height of the column of oil in the still, the hydrostatic pressure at the foot of the column, where vapor globules begin to form, may be (even if an absolute vacuum were provided in the vapor space) as high as several inches mercury absolute. In our process the depth of the "column" of oil is virtually negligible, and with an absolute pressure therein as high as several inches of mercury, the actual absolute pressure is less than in a batch still with a supposed absolute pressure of zero.

It will, therefore, be understood that one of the peculiar advantages of our process is that an extremely high vacuum (one or a few millimeters absolute pressure mercury) is actually obtainable, where it is desirable or necessary to reduce the distillation temperature of the highest boiling fractions to the lowest possible degree, whereas in batch stills, a very high vacuum, operative on the entire body of oil, is not obtainable at all.

It will be understood, however, that our invention is not limited to maintaining the oil under any particular absolute pressure, or to any particular pressure of mercury vapor; these being permissibly varying factors depending not merely on each other, but on the boiling points of the fractions to be vaporized, the velocity of flow of the oil, the thickness of the oil film, and the time during which the oil is subjected to vaporization, as will be more fully explained hereafter. In fact, one of the great advantages of our invention is that the heating medium is one whose temperatures of condensation at or near atmospheric pressures, or at moderate superatmospheric pressures (say two atmospheres), are such as are best adapted to the vaporization of all fractions of oil from which the lighter constituents, such as gasoline, have been distilled.

Our invention also embodies other features which are important and may be essential. It is obvious that no plant can be designed which would be ideally adapted to the distillation of all kinds and grades of oil. An apparatus adapted to carry out our process is necessarily arranged for fractional distillation and comprises a number of distilling units (say eight or ten) which are connected with a mercury vapor boiler (or with a plurality of mercury boilers generating mercury vapor at different absolute pressures) and through which units the oil flows successively, a fraction being evaporated off in each unit. While the apparatus may be so designed that, with a given kind or grade of oil, the oil, in each unit, will absorb from the mercury just the amount of heat required to evaporate the precise fraction desired; yet with another kind of oil, the oil, in each unit, will absorb from the mercury vapor too much or too little heat. We provide for governing the amount of heat absorbed in each unit by governing the volume of mercury vapor that is condensed during the time required for a given volume of oil to flow through the unit, and this in turn is most desirably governed by regulating the rate of flow of the mercury vapor into each unit.

In case the mercury vapor is generated at a rate faster than it is allowed to flow into the mercury vapor chambers of the vaporizing units, thus tending to raise the pressure in the boiler and consequently raise the temperature of condensation of the mercury vapor, we have provided for the condensation of the excess vapor as fast as it is formed, so as to restore, or rather to prevent the rise of, the boiler pressure.

The process is not dependent for its execution on the use of any particular construction of apparatus, but we have found it advantageous to carry out the process in a plant having the following structural characteristics.

A series of stills, or still units, are provided, each of which comprises a casing preferably in the form of a long tube or cylinder, the axis of which extends at a slight angle to the horizontal. Longitudinally extending within this casing is a metal partition or pan which divides the casing into two chambers: an upper oil vaporizing chamber, which is maintained under a high vacuum (say 28½ inches), and a lower mercury vapor chamber. The oil to be distilled enters the upper chamber at the higher end and spreads itself over the pan or partition in the form of a thin envelope or film and flows rapidly down the same toward the lower end. Mercury vapor is admitted to one end of the lower chamber in regulatable quantities—preferably by flowing it in continuously at a regulatable rate. In the lower chamber the mercury vapor is condensed and in condensing gives up its latent heat to the oil. By reason of the distribution of the oil over an extended surface in the form of a thin film, every particle of the oil is subjected to this heat almost instantly. Although the flow of oil through the oil-vaporizing chamber is rapid, yet if the mean temperature difference between the oil and the condensation temperature of the mercury vapor at the pressure at which it is under is sufficiently great, a definitely calculable fraction of the oil will be evaporated. The duration of exposure to heat, however, if the dimensions of the pan, its inclination, rate of inflow of oil, velocity of flow and thickness of film are carefully regulated, is not sufficiently great to effect any substantial amount of cracking or decomposition. Provision is made for the escape of the oil vapors without substantial contact of same with incoming oil, thereby avoiding refluxing, with resultant decomposition and cracking, and avoiding, also, entrainment of oil with outgoing vapors. If the factor of heat remains constant, and if the vacuum should be allowed to substantially fall, the vapor yield would be substantially reduced; whereas if the temperature should be elevated to compensate for the fall in degree of vacuum, the conditions of both increased heat and increased pressure would, with certain oils, create a serious amount of cracking of decomposition. On the other hand, an increase of vacuum to a degree corresponding to a small fraction of an inch of absolute pressure, would have no measureable effect on the quality of the oil that is formed by condensing the evaporated fraction; but to avoid excessive evaporation, the absolute pressure of the mercury vapor would have to be materially reduced so as to lower its temperature of condensation. That the quality of the distillate is not affected by maintaining a vacuum that is far from perfect is, it is believed, explainable on the theory that when the composite factor of heat, duration of application of heat and absolute pressure is reduced to the point required to practically eliminate cracking, no further reduction in any one of the constituent factors can have any effect on the quality of the distillate.

The mercury vapor is conducted from a mercury boiler to the mercury vapor chamber through a valve, which is throttled to the extent required to admit the mercury vapor at the rate required to cause a given volume of the vapor to be condensed in a given time, thus predetermining the amount of heat absorbed by the oil and the proportion thereof that will evaporate. This valve may be automatically controlled by a thermostat in the mercury vapor chamber or in the oil vaporizing chamber or in the pipe through which the residual oil is discharged from the oil vaporizing chamber; but there are advantages in manual control, provided known means are provided to take temperature readings at one or all of these locations.

While, as hereinbefore stated, the practice of the process is not dependent upon any particular construction of apparatus, a workable apparatus must necessarily be designed in order to practice the process at all. The drawings show, largely in diagram, a large plant capable of running 100 barrels of oil hourly. The plant is designed for the distillation of a reduced or topped crude oil from which it is desired to extract lubricating oils. In designing the plant, we have provided for ten units of uniform dimensions, and in describing the plant and its operation, we shall specify permissible dimensions and other structural features of different parts of the plant, and shall also specify permissible velocities of flow, depths of films, absolute pressures in the mercury vapor system and in the oil system, temperatures of the oil and of the mercury vapor, mean temperature differences between oil and mercury, percentages vaporized in each unit, time during which the oil is subjected to heat in each unit, and other factors. It should be distinctly understood, however, that the plant may be of any size and capable of handling any desired volume of oil, that the units need not be of uniform construction, and that all the other factors specified may be varied within considerable limits. In fact, variations in one set of factors necessitate variations in other sets of factors. The specific data hereinafter given are, therefore, intended to be merely illustrative.

The oil to be distilled, preferably topped crude oil containing all the lubricating fractions, is conveyed, by means of a pump or pumps $a$, through a pipe $b$, to the vaporizer of the first distilling unit of the plant, which may comprise any desired number of units, ten being shown. The ten vaporizers are numbered 1 to 10 inclusive and the ten condensers are numbered 11 to 20 inclusive. Each vaporizer (see Figs. 6 and 7) comprises an oil chamber $c$ and a mercury vapor chamber $d$, separated one from another by a longitudinally extending pan or partition $e$. Each vaporizer is arranged to have a slight inclination to the horizontal.

From the oil vaporizing chamber $c$ of each vaporizer the residual oil flows, through a pipe $f$, to the oil vaporizing chamber of the next vaporizer. From the oil vaporizing chamber of the last vaporizer 10 the heavy residue flows, through a pipe $g$, to a discharge tank (tar tank) $h$.

From the bottom of the tar tank is an outlet pipe having valved branch pipes $i$ through which pumps $j$ are adapted to draw the tarry residue from tank $h$ to storage.

From the oil vaporizing chamber of each vaporizer extend multiple vapor outlet pipes $k$ leading to a condenser. As hereinbefore stated, there are ten of these condensers, one for each vaporizer. Each condenser is connected, through a pipe $m$, with a distillate receiving tank $n$. Suitable means should be provided for pumping the distillate from the tank. The drawings, which disclose one of many possible arrangements, show a valved pipe $o$ leading from the bottom of each tank. The pipes $o$ from a pair of adjacent tanks lead to a valved pipe $p$. There are five pairs of pipes $o$ and five pipes $p$. The pipes $p$ connect with a valved manifold $r$, which connects, through valved pipes $s$ and pumps $t$, with another valved manifold $u$, from which extend valved pipes $q$ to storage tanks (not shown). By this arrangement, the distillate from any tank $n$ may be pumped, through any of the pumps, to any one storage tank. Usually, the distillates from condensers 11 and 12 will be conveyed to one storage tank, the distillates from condensers 13 and 14 to another storage tank, and so on. It will be understood, however, that the number of pipes to storage may be varied as desired, so as to produce as many different gravity cuts (not exceeding the number of condensers) as may be desired.

From the top of each tank $n$ extends a valved air exhaust pipe $v$. The various pipes $v$ may be connected to vacuum pumping means in any one of a number of different ways. As shown, the pipes $v$ from the five tanks $n$ connected with condensers 11 to 15 inclusive extend to one manifold and the pipes from the five tanks $n$ connected with condensers 16 to 20 inclusive extend to another manifold. Each of these manifolds is lettered $w$. Each manifold $w$ connects with a pair of vacuum pumps $x$. By means of these four vacuum pumps, or any one or more of them, the desired vacuum is maintained in the entire oil circulating system.

The pump $j$ and pumps $t$ withdraw oil at intervals from tank $h$ and tanks $n$ while working against the vacuum in the oil circulating system; but the tanks may be made of such height that the head of the columns of oil in the tanks may in part, or even in whole, counterbalance the vacuum so as to reduce to the degree desired the power that must be expended by these pumps to withdraw the oil; it being understood that it is preferred to maintain the tanks nearly full so as to take advantage of the head of the oil columns.

From mercury boilers 30, 31, extend vapor outlet pipes 32 having ten branches 33 leading respectively through ten valves 34 (preferably manually operable) to the ten mercury vapor chambers or conduits $d$ of the respective vaporizers 1 to 10 inclusive. Each branch pipe 33 may communicate with either end of the chamber $d$ with which it connects. We have shown it in communication with the higher end of the chamber $d$. The mercury vapor condenses as it flows through the chamber $d$ in heat exchange relation with the oil flowing down along the pan $e$ that separates chamber $d$ from the oil vaporizing chamber $c$. The mercury condensate flows out the lower ends of chambers $d$ into pipes 35 connected with headers 36 that convey the mercury back to the boilers 30 and 31.

It is not necessary to provide more than one mercury boiler; but in a large plant it is desirable to provide two or more. One mercury boiler may be connected with one set of vaporizers and the other or others with another set or sets of vaporizers. In the drawings, boiler 30 is connected with vaporizers 1 to 4 inclusive and boiler 31 with vaporizers 5 to 10 inclusive. This arrangement is arbitrary and need not be adhered to. The advantage of providing a plurality of boilers is that it affords a convenient means of maintaining the mercury under as many different absolute pressures, thereby providing for a relatively low temperature of condensation in the set of vaporizers through which the oil first flows and for a relatively high temperature of condensation in the set of vaporizers through which the oil flows after it has been deprived of its lower boiling point fractions; it being desirable to have a relatively high condensing temperature for the mercury vapor which heats the oil containing the higher boiling point fractions.

Each of the several valves 34 are so set as to admit to the corresponding chamber $d$ mercury vapor at such rate that on condensing it will liberate enough latent heat to drive off from the oil, in its passage through chamber $c$, a predetermined percentage of the oil in the form of vapor. Once properly set, the valves 34 need not be adjusted during the distilling process. If, however, a different grade or quality of topped crude oil should be admitted to the distilling apparatus, the valves 34 should be adjusted to properly regulate the percentage of oil vaporized in each vaporizer. The valves 34 may be controlled manually; or they may be controlled automatically by means of thermostats arranged in the residual oil outlet from each vaporizer and operable in accordance with the temperature of such escaping residual oil, or in any other way.

While the temperature of condensation in the several mercury vapor chambers $d$ connected with each mercury boiler may be varied within somewhat wide limits, it is desirable that such temperatures shall be predetermined and remain constant during the distilling operation. It is therefore desirable that the pressure in each of the two mercury systems shall remain constant. This pressure may be regulated in different ways. The volume of mercury generated, however, must be at least sufficient to supply the mercury vapor chambers of all the vaporizers at the rate required to liberate, by its condensation, the heat necessary to vaporize the predetermined percentages of oil. This will usually require that a slight excess of mercury vapor shall be generated. It is important that this vapor be condensed without allowing the column of liquid mercury to rise and increase the boiler pressure. To effect this, I resort to the following simple expedient.

Figure 5:
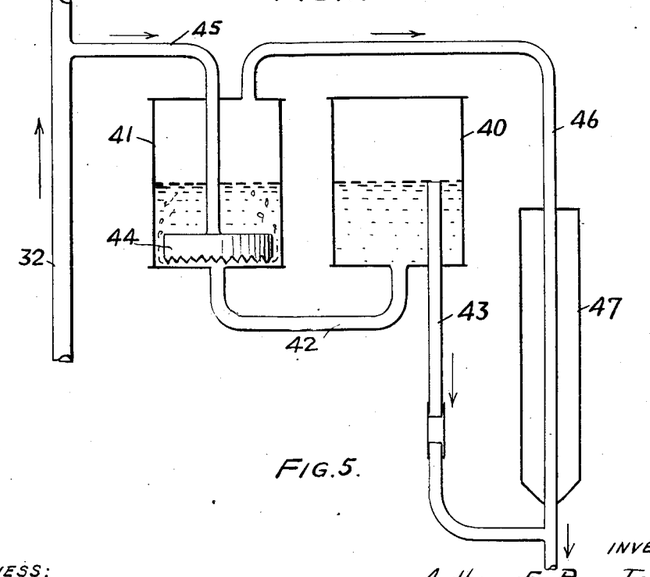
Fig. 5 is a detail view, in elevation, of the means for maintaining constant the pressure in the mercury vapor system.

40 and 41 are two liquid mercury cups, which are connected by a pipe 42. Into one of these cups 40 extends a pipe 43 from the boiler. Pipe 43 contains liquid mercury, and the height to which it extends in cup 40 determines the level of mercury in both cups 40 and 41. Within cup 41 is a bubbler 44. The bubbler comprises a hollow open-bottom chamber immersed in the mercury and provided with serrations in its lower edge. Bubbler 44 communicates with a by-pass 45 connected with the main mercury vapor feed pipe 32. A vapor pipe 46 from cup 41 passes through a condenser 47 communicating with the header 36.

When the pressure in the system exceeds the pressure desired to be maintained therein, mercury vapor flows through pipe 45 and bubbles up through the seal of liquid mercury in cup 41 and thence flows, through pipe 46, to condenser 47, from which the condensate returns to the boiler. By elevating overflow pipe 43, thus raising the level of the liquid mercury in cups 40 and 41, the pressure in the system may be increased. By lowering overflow pipe 43, the pressure in the system may be decreased.

Figures 6, 7, 8, 9:
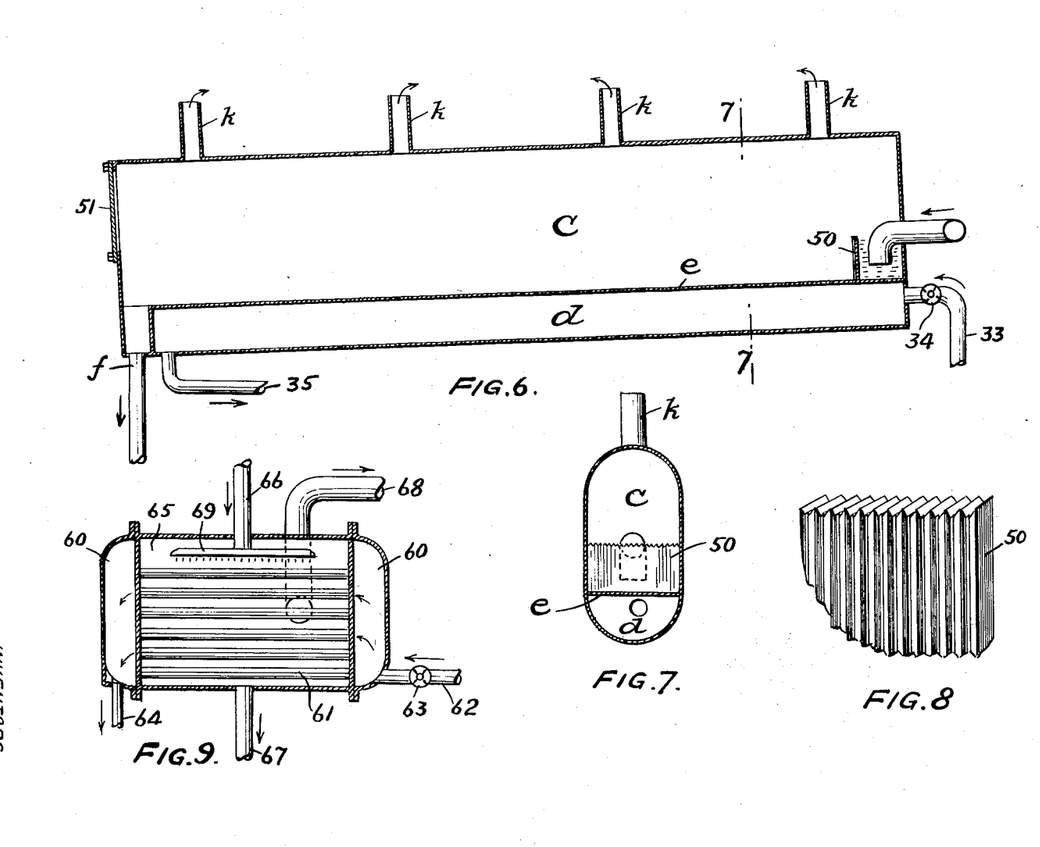
Fig. 6 is a longitudinal section through one of the vaporizers.
Fig. 7 is a cross-section on the line 7—7 of Fig. 6.
Fig. 8 is a partial perspective view of the oil distributor in the oil chamber of the vaporizer.
Fig. 9 is a longitudinal section view of a modified vaporizing unit.

One of the vaporizers 1 to 10 inclusive is shown in detail in Figs. 6-8. It comprises a long chamber of a height greater than its width, divided, as hereinbefore described, by a longitudinally extending partition $e$, into an oil vaporizer chamber $c$ and a mercury chamber or conduit $d$. The oil inlet pipe extends into the upper end of the oil vaporizer chamber $c$ and has a downturned discharge end. In front of the oil inlet pipe is a weir or distributor 50, which is corrugated across its upper edge and also vertically down its front face. The oil rises in the space back of the distributor and flows over the distributor and down along its front face, thereby insuring a distribution of the oil equally across the chamber $c$. The partition $e$ is of considerable area, so that the oil flows down along the same in a shallow stream or thin film, thereby establishing excellent conditions for heat exchange with the mercury vapor in chamber $d$. The front end of the oil vaporizing chamber $c$ is closed by a cover plate 51.

Figure 1:
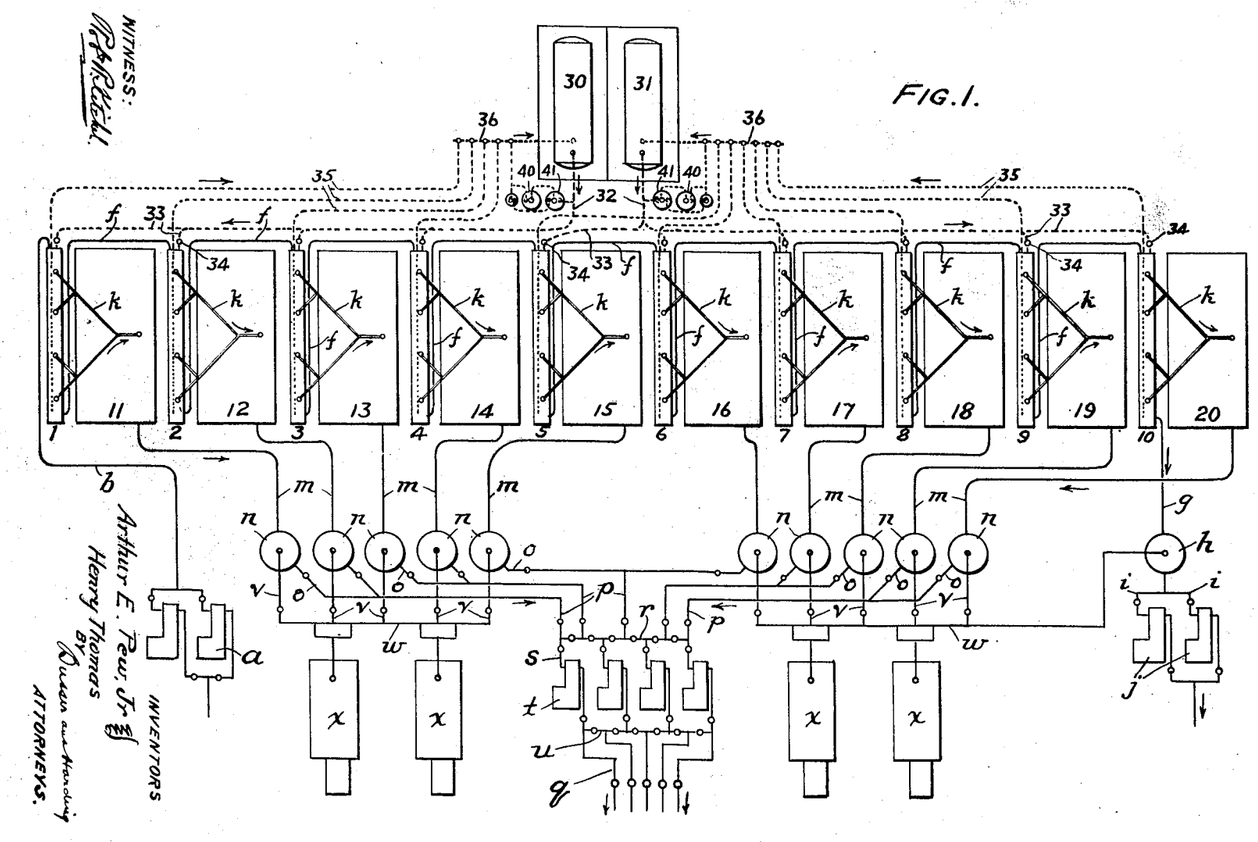
Fig. 1 is a diagram, in plan, of the entire distilling plant.
Figure 1A:
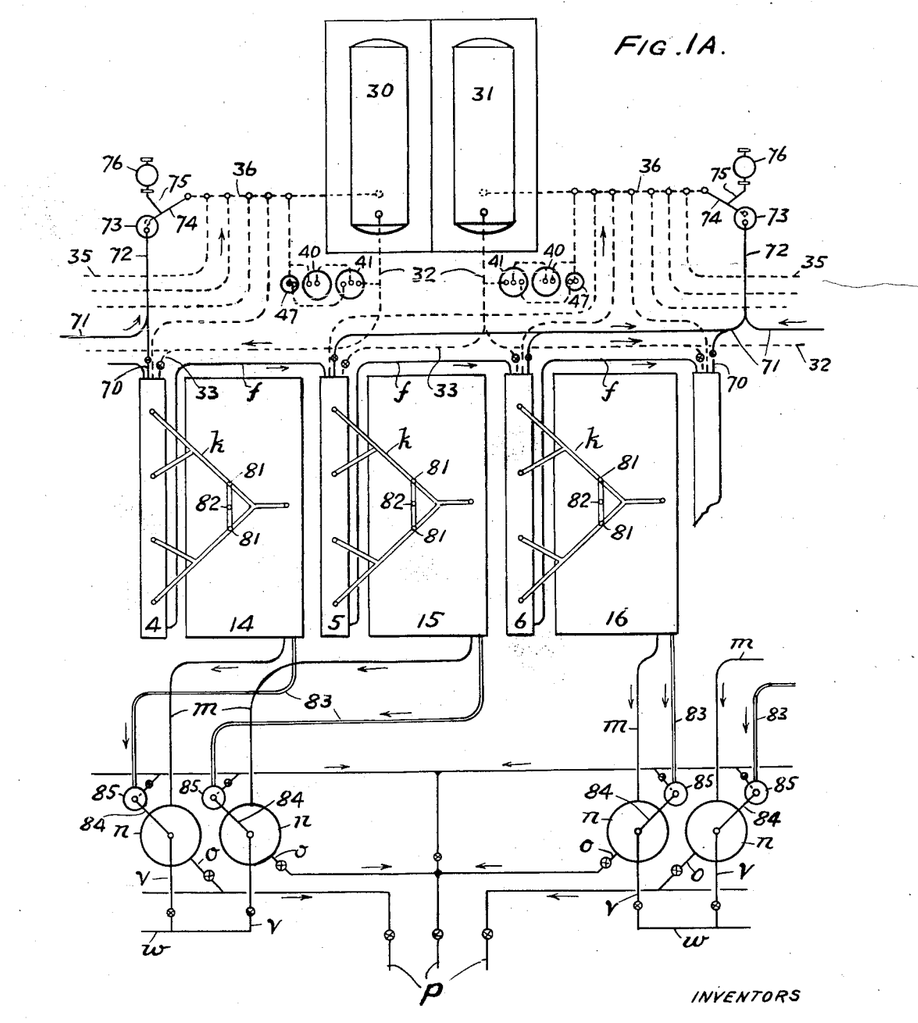
Fig. 1A is a view of a part of Fig. 1, enlarged to show more details.
Figure 4:
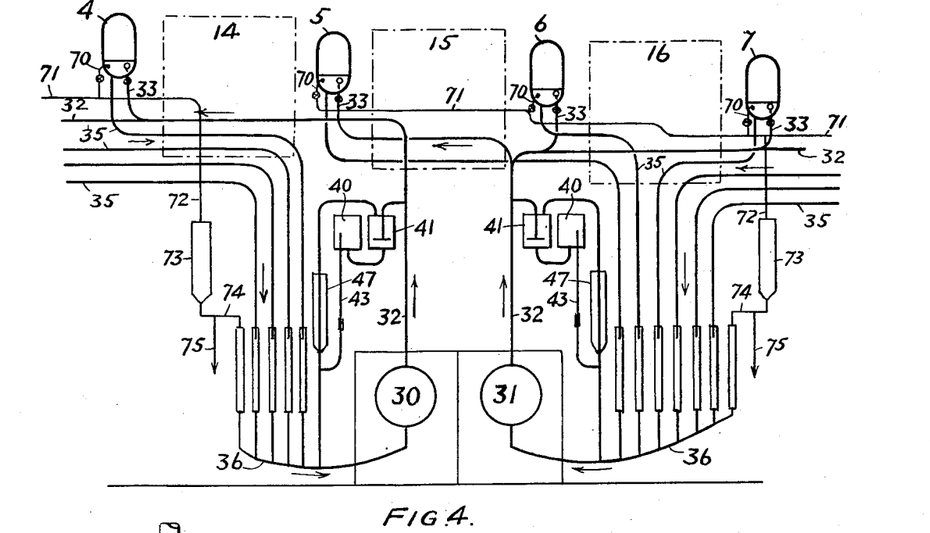
Fig. 4 is a diagram, in elevation, of the mercury vapor circulating system.

A vacuum pump should be connected with the mercury vapor system in order to exhaust air therefrom prior to heating the mercury boiler. In the vaporization of mercury, certain fixed or permanent gases are formed which should be removed. The removal may be effected in different ways. We prefer to so connect the vacuum pump with the mercury vapor system that these fixed gases may be removed by operating such vacuum pump at intervals. From the mercury vapor chamber $d$ of each vaporizer extends a valved pipe 70 connected with a pipe 71, which, through a pipe 72, connects with a condenser 73 (see Figs. 1A and 4). Through a condensate pipe 74, condenser 73 communicates with header 36. Pipe 74 connects, through pipe 75, with a vacuum pump 76. From time to time, the vacuum pump may be operated to withdraw from the mercury vapor system any fixed gases which have accumulated.

Figures 2, 3:
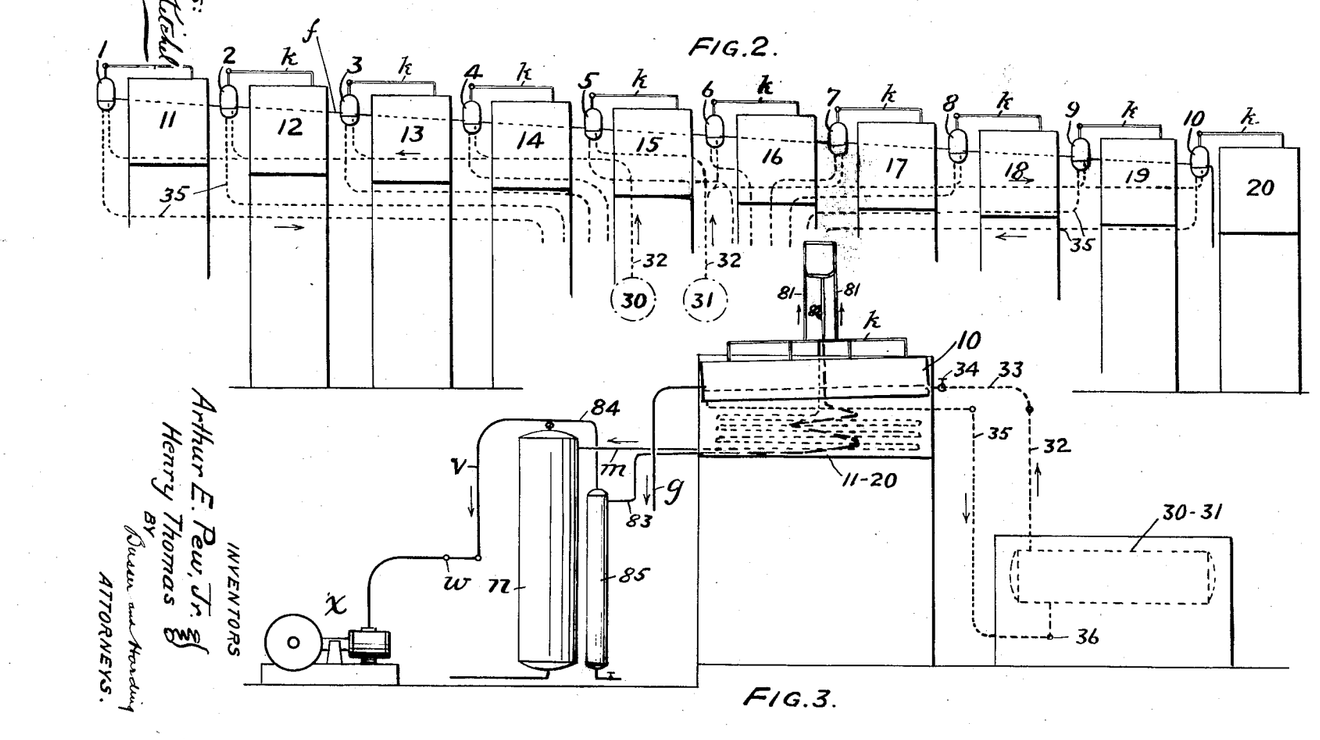
Fig. 2 is a diagram, in elevation, of part of the plant.
Fig. 3 is a view, in elevation, of one of the distilling units, comprising a mercury boiler, a vaporizer, a condenser, and a distillate tank; and the connection therewith of a vacuum pump for maintaining the oil circulating system under vacuum.

It is advisable to make provision for deodorizing the oil in the process of distillation. Vapors that are driven off from the oil in the oil vaporizing chambers and that, if condensed, would contaminate the distillates, are allowed to escape (being lighter than the oil vapors) from pipes $k$ (see Figs. 1 and 3) through pipes 81, whence they flow, by means of pipes 82, through condensers 11, 12, etc., wherein they are largely condensed, the condensate, as well as uncondensed fixed gases, flowing through pipes 83 to tanks 85 respectively adjacent the distillate tanks $n$. An extension 84 from vacuum pipe $v$ connects with the upper part of each tank 85. By operating the vacuum pump, any uncondensed gases may be withdrawn, continuously or intermittently, from the oil system during operation.

Having described the construction of a plant adapted to carry out the process, we shall now describe, in detail, the operation of the plant, and shall give certain data with considerable particularity; it being understood, however, that great variation from the data given is permissible, and that any change in any of the factors involves a change in one or more of the other factors. The factors of most importance may be enumerated as follows: The capacity of the apparatus, the number of distilling units, the absolute pressure within each mercury vapor system (if there be more than one), the degree of vacuum in the oil system, the dimensions and degree of inclination of the vaporizers, temperatures of the oil entering and leaving each vaporizer, the mean temperature difference between the mercury and the oil in each vaporizer, the velocity of flow of the oil through each vaporizer, the depth of the stream of oil flowing down through each vaporizer, the time during which the oil remains in each vaporizer, and the percentage of oil vaporized in each vaporizer.

As hereinbefore stated, we prefer to maintain a vacuum throughout the oil system of about 28½ inches. This or any other desired absolute pressure is established and maintained by means of vacuum pumps $x$. After the desired degree of vacuum is established in the oil system, the valves between tanks $n$ and $h$ and the pumps $x$ should be maintained open just sufficiently to continuously withdraw the permanent gases driven off from the oil. It seems of importance, however, to seal the system against access of air, so as to avoid any circulation of air through the oil vaporizer, however high a vacuum may be maintained therein. If the vacuum falls below a predetermined degree, the valves between the pumps $x$ and the tanks $n$ and $h$ may be opened more freely until the desired degree of vacuum is established. It is unnecessary to secure an absolutely uniform vacuum in the oil vaporizing chambers of all ten oil distilling units, but it is desirable to maintain an approximately uniform vacuum therein. If the vacuum be maintained substantially below or above 28½ inches, it will necessitate a change in many other factors in order to produce the same results. It will be understood, however, that my invention is not limited to any particular absolute pressure in the oil vaporizing chamber. Below a certain minimum, which we are not prepared to definitely fix, because it varies with the quality of the oil, but which is probably below twenty-five inches of vacuum even if the oil contains decomposable constituents, there appears to be a decided fall in the quality of the distillates. Above a minimum degree of vacuum, which varies with the quality of the oil, there appears to be no improvement in the quality of the product, although it permits, obviously, of a reduction in the temperature of distillation in each unit in order to secure the same yield.

In the mercury boiler 30 there is maintained a pressure slightly above atmospheric, so as to give a mercury condensation temperature of about 680° F. (Mercury vapor at atmospheric pressure condenses at 672° F.) In the mercury boiler 31 there is maintained a pressure of about thirty inches absolute, so as to give a temperature of condensation of about 750° F.

It is desirable to have all the still units of the same size. In the apparatus herein described, each vaporizer is five feet high and 2½ feet wide. Of the specified height, about 1 foot 3 inches is occupied by the mercury vapor chamber $d$, and the remainder by the oil vaporizing chamber. The vaporizers are about twenty feet in length and are inclined so as to have a fall of about one foot in thirty-four feet.

Assume that topped crude Texas oil having an average gravity of 17.5 Bé. and a temperature of 380° F. is admitted to the oil vaporizing chamber c of vaporizer 1 at the rate of one hundred barrels (4200 gallons) of oil per hour. Such oil will occupy 5.9 seconds in traversing the chamber from the top of pan e to the bottom. Its velocity of flow will be about 3.4 feet per second and the average depth of oil on the pan will be about 13/60th of an inch. About twelve per cent., or twelve barrels of oil per hour, will be vaporized and pass to the condenser. The residual oil that passes to the second still unit will have a temperature of about 400° F.

In the second vaporizer, the oil, entering at about 400°, will traverse the pan in about 5.8 seconds, its velocity of flow will be about 3.4 feet per second and the average depth of oil in the pan will be something less than a fifth of an inch. About sixteen barrels of oil per hour will be vaporized and pass to the condenser.

The oil enters the other vaporizers at progressively increasing temperatures. The times occupied in the flow of the oil through the vaporizers progressively increase, and the depths of the streams of oil and its velocities of flow progressively diminish. The yield of distilled oil varies from nine to ten barrels per hour in the third to sixth unit and then progressively falls in the succeeding units. The heavy residual oil enters vaporizer 10 at about 685° F. and the final tarry residue, amounting to about ten barrels per hour, leaves this vaporizer at a temperature of about 702° F. In this vaporizer, the time required for the oil to traverse it is about 15.5 seconds, while the velocity of flow falls to about 1.29 feet per second and the depth of the stream to less than a tenth of an inch. About four barrels of oil per hour are vaporized in this vaporizer.

It is essential, in the later vaporizers of the series, that the temperature of condensation should be substantially above that (672° F.) at which the mercury condenses at atmospheric pressure. The heaviest vaporizable constituents have a boiling point, even in a vacuum of 28½ inches, in excess of the last mentioned temperature. Hence, it is essential that, in the later vaporizers, the mercury vapor shall be generated at superatmospheric pressure. In operating the apparatus herein described, mercury boiler 31 is at a pressure of about two atmospheres, which pressure corresponds to a condensation temperature of about 750° F., as hereinbefore stated; and we have connected this boiler with the last six vaporizers of the series.

It is quite possible to carry on our process by means of a single mercury boiler at a pressure sufficient to give a condensation temperature sufficiently high to furnish the heat required to vaporize the heaviest fractions which it is desired to distill, and to limit the transfer of heat to the oil containing the lighter constituents by more or less throttling the valves 34 controlling the admission of mercury vapor to the mercury chambers of the vaporizers. The necessary control of the distillate yield in each distilling unit can also be effected by varying the size or inclination, or both, of the vaporizing units, or by varying the rate of flow of oil into the distilling apparatus, and thereby controlling the depth and velocity of the running stream in each vaporizer and the time which the oil occupies in its traverse through each vaporizer; but the provision of two or more separate mercury boilers has distinct advantages in the way of simplification of the apparatus and the economical practice of the process.

The factors that contribute to the success of the process hereinbefore described, some, if not all, of which are indispensable, seem to be: the use, as a heating agent, of mercury vapor, whose condensation temperatures, at or near atmospheric pressure up to a moderate superatmospheric pressure, are as near as possible within the range desirable for the distillation of mineral oil and particularly lubricating oils; the maintenance of the oil (unless it be of very high grade), during vaporization, under a vacuum but not necessarily an extremely high vacuum; the avoidance of leakage of air into the oil system; the distribution of the oil over an extended area in the form of a thin film and in heat exchange relation, but out of contact, with the mercury vapor; the retention of the oil within the heat zone for a restricted time; the regulation of the rate of flow of the mercury vapor into heat exchange relation with the oil so as to control the number of heat units that are transmitted thereto and limit the percentage of oil distilled in each vaporizer; the avoidance of refluxing; the direct exchange of heat between the heating medium and the film of liquid oil with avoidance of direct exchange of heat between the heating medium and the oil vapors; and apparently, also, the flow of the oil through the vaporizing chambers at a high rate of speed and the avoidance of air currents in the oil vaporizing chambers. In short, the use of mercury vapor, low pressure differences, vaporization under vacuum, and the specified mode of evaporation, are factors without all of which (except possibly vaporization under vacuum) liberal yields of superior distillates, requiring no subsequent purification by chemical treatment or filtration, are unobtainable. The adaptability of the apparatus to continuous operation is also a factor of great importance.

The apparatus has a large output relative to its size; it is cheap to construct, considering its great capacity; the temperatures are easy to control; and no difficulty is experienced in maintaining it in continuous operation. The most considerable item of expense is the cost of the mercury, but there is no escape of mercury from the system, and consequently it is an item of capital expenditure and not an item of cost of operation.

The surface of the partition or tray in the vaporizer is not liable to cake, because of its proportions and the controllable velocity of the oil. If necessary to clean it, it is readily accessible and its flat surface facilitates cleaning.

It is obvious that the main item of operating expense in the practice of the process is the cost of the fuel (preferably oil) required to heat the mercury boilers; but in our process it is believed that there is less waste heat than in any other known process. The operation of the apparatus is so largely automatic that all the labor required is that of general supervision.

The capacity of the large commercial unit equals the capacity of a typical refinery covering some acres of ground, and comprising, besides large stills, tanks for chemical treatment, filters and much other mechanism, requiring, for its operation, maintenance and repair, supervision and labor involving comparatively great expense.

An alternative, but less preferable, form of vaporizer is shown in Fig. 9, in which headers 60, 60 are connected by a nest of tubes 61 within an enclosure 65. Mercury vapor is admitted to one of the headers through a pipe 62 on which is a feed control valve 63. Pipe 64 affords an outlet for condensed mercury. The enclosure 65 forms the oil vaporizer chamber, which has an inlet pipe 66 for oil, an outlet pipe 67 for residue and a vapor discharge pipe 68. The oil inlet pipe 66 communicates with a distributor 69 in the top of the oil vaporizing chamber 65, from which distributor the oil flows down over the tubes 61. The oil spreads over the surfaces of the tubes in a thin layer so as to expose, to the greatest possible degree, every particle of the oil to the influence of heat and thereby effect a relatively rapid rise in its temperature; the oil flowing by gravity from tubes at a higher level to tubes at a lower level, the lighter fractions of the oil, in the course of its downward progress, being vaporized. At the same time mercury vapor flowing in the tubes 61 is condensed.

It will be understood that the tubes 61, or the tubes and headers 60, are the equivalent, in a broad sense, of the elongated narrow chamber $d$ of any of the vaporizers 1 to 10 inclusive and that the chamber 65 is the equivalent of the oil vaporizing chamber $c$ of such vaporizer.

The apparatus shown in Fig. 9, however, may not be practically operative to secure the objects of the invention unless substantial condensation of driven-off vapors by downflowing oil be avoided. In other words, a material amount of refluxing, if it results in substantial decomposition or cracking, must be avoided; and therefore, it is distinctly preferred to use an apparatus, such as that shown in the preferred embodiment of the invention, wherein means are provided for the free escape of the oil vapors as soon as they are formed.

We do not herein claim that embodiment of the process herein described which requires that the entire volume of oil undergoing vaporization shall be under a vacuum equivalent to an absolute pressure of 25 millimeters mercury or less; the process involving this feature being the subject-matter of an application filed by us March 17, 1924, Serial No. 699,615, of which the present application is in part a continuation.

We do not herein claim the apparatus herein described, as this forms the subject-matter of a separate application.

While the invention has been described as applicable to the distillation of lubricating oil from topped crude oil, and finds therein its most useful and important application, it is adapted, also, to the distillation of lubricating oil from crude oil which has been cracked and afterward purified by chemical treatment. The process is also adapted to the distillation of lighter constituents from the crude oil itself or from crude oil from which has been distilled off only part of such lighter constituents. To adapt the process to any kind of distillation, it is necessary only to suitably modify the different variable factors hereinbefore specified, which modification is within the capacity of those skilled in the art of refining oil.

It will be understood that in specifying mercury vapor, it is not intended to exclude as an equivalent any vaporizable metallic liquid having substantially the qualities of mercury vapor hereinbefore enumerated.

Where in the claims we refer to lubricating oil, we mean to include oil having lubricating properties, the lighter grades of which may have entrained therewith a proportion of lighter oils having no substantial lubricating properties. It is intended, of course, to comprehend lubricating oils which may not be used for lubricating purposes; it being customary to use lubricating oils for purposes other than lubrication and in the manufacture of materials not intended for lubrication.

Where in the claims we specify minimizing cracking, which does not imply the absolute prevention of cracking, we mean to include also a practically absolute prevention of cracking, such as we may secure in those units in which, with a given absolute pressure on the oil, the vaporizing temperature of the fraction intended to be vaporized is below, or not materially above, a cracking temperature; it being possible, in our process, to effect such vaporization without raising the temperature of the mercury vapor much above the temperature of vaporization of the oil, owing to the very small required temperature difference between the heating and heated media that is possible where mercury vapor is the heating medium and it transfers its latent heat by condensation. It is not, however, intended to exclude such practice of the process as may not minimize cracking to the degree which is possible when the process is conducted with the highest efficiency.

What we claim is:

1. The process of distilling mineral oil which comprises flowing a stream of oil through a series of confined spaces maintained under low subatmospheric pressure and in each of said confined spaces establishing a rapid flow of a substantially unbroken sheet of oil of very small depth relative to its width and of approximately uniform thickness, generating mercury vapor from a body of liquid mercury and flowing such vapor into confined paths arranged in multiple with respect to each other and in heat exchange relation with the respective confined spaces, and maintaining such limited temperature of the mercury vapor in each confined path and such absolute pressure on the oil in the corresponding confined space as to effect, by heat exchange and condensation of mercury vapor, partial vaporization of the oil while minimizing cracking, returning condensed mercury to the body of liquid mercury, and removing the oil vapors and condensing them.

2. The process of distilling mineral oil which comprises flowing a stream of oil through a series of confined spaces mantained under low subatmospheric pressure and in each of said confined spaces establishing a rapid flow of a substantially unbroken sheet of oil of very small depth relative to its width and of approximately uniform thickness, generating mercury vapor from a body of liquid mercury and flowing such vapor into confined paths arranged in multiple with respect to each other and in heat exchange relation with the respective confined spaces so as to effect, by heat exchange and condensation of mercury vapor, partial vaporization of the oil flowing through each confined space, returning condensed mercury to the body of liquid mercury, and removing the oil vapors from each confined space while preventing substantial flow thereof into an adjacent confined space.

3. The process of distilling lubricating oil which comprises flowing a stream of oil continuously into, through and out of one or more confined spaces and while the oil is passing therethrough distirbuting it over, and maintaining the progressive travel of the oil over, a surface or surfaces adapted to be heated, generating mercury vapor from a body of liquid mercury and flowing such vapor, at a rate below that of its generation, into heat exchange relation, but out of contact, with the so flowing and distributed oil and thereby, by heat exchange with the oil effecting condensation of mercury vapor and vaporization of oil, returning condensed mercury to the body of liquid mercury, and maintaining a substantially constant autogenous pressure on the liquid mercury undergoing vaporization notwithstanding the generation of mercury vapor at a rate exceeding that at which it flows into heat exchange relation with the oil.

4. The process of distilling lubricating oil which comprises flowing a stream of oil continuously into, through and out of one or more confined spaces and while the oil is passing therethrough distributing it over, and maintaining the progressive travel of the oil over, a surface or surfaces adapted to be heated, generating mercury vapor from a body of liquid mercury and flowing such vapor into heat exchange relation with the so flowing and distributed oil and thereby, by heat exchange with the oil, effecting condensation of mercury vapor and vaporization of oil, returning condensed mercury to the body of liquid mercury, and flowing any mercury vapor generated in excess of that which flows into heat exchange relation with the oil through a seal of liquid mercury and condensing the same and returning it to the body of liquid mercury.

5. The process of distilling lubricating oil which comprises flowing a stream of oil continuously into, through and out of one or more confined spaces and while the oil is passing therethrough distributing it over, and maintaining the progressive travel of the oil over, a surface or surfaces adapted to be heated, generating mercury vapor from a body of liquid mercury and flowing such vapor into heat exchange relation with the so flowing and distributed oil and thereby, by heat exchange with the oil, effecting condensation of mercury vapor and vaporization of oil, returning condensed mercury to the body of liquid mercury, and regulating the pressure of the mercury vapor at the locus of generation by flowing through a seal of liquid mercury any mercury vapor generated in excess of that which flows into heat exchange relation with the oil and by maintaining a predetermined level of mercury in said liquid seal.

6. The process of distilling lubricating oil which comprises flowing a stream of oil continuously into, through and out of one or more confined spaces and while the oil is passing therethrough distributing it over, and maintaining the progressive travel of the oil over, a surface or surfaces adapted to be heated, generating mercury vapor from a body of liquid mercury and flowing such vapor, at a rate below that of its generation, into heat exchange relation, but out of contact, with the so flowing and distributed oil and thereby, by heat exchange with the oil, effecting condensation of mercury vapor and vaporization of oil, and condensing mercury vapor in excess of that flowing into heat exchange relation with the oil and also any mercury vapor that has flowed into heat exchange relation with the oil and that has not been condensed by such heat exchange, and returning all of said condensates to the body of liquid mercury.

7. The process of vaporizing mineral oil which comprises continuously flowing a stream of oil successively through a series of confined spaces and distributing the oil in each space over a large superficial area, subjecting two bodies of liquid mercury to heat and generating mercury vapor at different absolute pressures, conveying mercury vapor generated at the lower absolute pressure into heat exchange relation with the oil flowing through a number of successive confined spaces through which the oil stream first flows to effect, by heat exchange and condensation of mercury vapor, vaporization of progressively higher boiling point oil fractions of relatively low boiling point constituents, and conveying mercury vapor generated at the higher absolute pressure into heat exchange relation with the oil flowing through a number of successive confined spaces through which a more advanced part of the oil stream flows to effect, by heat exchange and condensation of mercury vapor, vaporization of progressively higher boiling point oil fractions of relatively high boiling point constituents.

8. The process of distilling mineral oil which comprises flowing a stream of oil through a series of vaporizers maintained under low subatmospheric pressure and in each of said vaporizers establishing over the floor thereof a rapid flow of a substantially unbroken sheet of oil of very small depth relative to its width and of approximately uniform thickness and of very small volume relative to the volume of the vapor space in said vaporizer above said flowing sheet, effecting in each vaporizer, through the floor thereof, partial vaporization of the oil by heat exchange with and condensation of mercury vapor, and maintaining the oil vapors, after they leave the surface of the liquid oil, out of heat exchange relation with the heating medium.

9. The process of distilling mineral oil which comprises flowing a stream of oil through a series of vaporizers maintained under low subatmospheric pressure and in each of said vaporizers establishing over the floor thereof a rapid flow of a substantially unbroken sheet of oil of very small depth relative to its width and of approximately uniform thickness and of very small volume relative to the volume of the vapor space in said vaporizer above said flowing sheet, effecting in each vaporizer, through the floor thereof, partial vaporization of the oil by heat exchange with and condensation of mercury vapor, and withdrawing the oil vapors at a plurality of points along the length of the vapor space.

10. The process of distilling mineral oil which comprises flowing a stream of oil through a series of vaporizers maintained under low subatmospheric pressure and in each of said vaporizers establishing along the floor thereof a rapid flow of a substantially unbroken sheet of oil of very small depth relative to its width and of approximately uniform thickness, effecting in each vaporizer, through the floor thereof, partial vaporization of the oil by heat exchange and condensation of mercury vapor, and withdrawing the oil vapors, immediately upon formation, from the vaporizer through an unobstructed vapor space therein above the flowing sheet of liquid oil.

ARTHUR E. PEW, JR.
HENRY THOMAS.